United States Patent Office 3,394,993
Patented July 30, 1968

3,394,993
STABILIZED HYDROGEN PEROXIDE
COMPOSITIONS
Richard A. Grifo, Easton, Pa., assignor to General Aniline
& Film Corporation, New York, N.Y., a corporation of
Delaware
No Drawing. Filed Oct. 24, 1966, Ser. No. 588,705
6 Claims. (Cl. 23—207.5)

ABSTRACT OF THE DISCLOSURE

Aqueous solutions consisting essentially of about 0.5 to 35 percent by weight of hydrogen peroxide are stabilized against deterioration due to oxygen or related degradation upon standing and storage by adding to such solutions a stabilizing amount of an organic phosphate ester selected from the group consisting of monophosphate esters, diphosphate esters and mixtures thereof, wherein said phosphate esters have the general formula

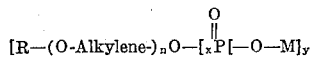

wherein R represents an organic radical of at least 6 carbon atoms, wherein the alkylene radical contains from 2 to 5 carbon atoms, where $n$ is an integer of at least 1, wherein Y represents an integer of from 1 to 2 and the sum of the integers of X and Y is 3 and wherein M represents a radical selected from the group consisting of hydrogen, an alkali metal, an alkaline earth metal, ammonia, and an amine radical.

---

This invention is directed to stabilized hydrogen peroxide compositions. More particularly, the instant invention is directed to stabilized aqueous hydrogen peroxide compositions containing a stabilizing amount of an organic phosphate ester.

It is well known that hydrogen peroxide, even when present in an aqueous composition, is adversely affected by oxygen and therefore, susceptible to deterioration due to oxygen or related degradation upon standing and storage. This is a serious disadvantage to industry, since such concentrates often must be stored for extended periods of time up to weeks or months. A number of various anti-oxidant inhibitors have been proposed for the purpose of preventing such oxidative deterioration. However, these known antioxidants vary in their effectiveness and by and large exhibit one or more disadvantages such as being expensive, failing to prevent effervescence, imparting undesirable color, or lacking sufficient solubility. For example, the use of acid antioxidants such as sodium acid pyrophosphate to inhibit decomposition of hydrogen peroxide solutions have been proposed, however this salt is relatively ineffective as a hydrogen peroxide unless additional components are also present. Moreover, the use of sodium acid pyrophosphate alone does not inhibit the effervescence of the aqueous hydrogen peroxide solution.

It is an object of this invention to provide a stabilized aqueous hydrogen peroxide composition which is not subject to the above mentioned disadvantages. Another object of this invention is to provide a stabilized aqueous hydrogen peroxide composition containing a stabilizing amount of an organic phosphate ester, thereby extending the useful life span of the aqueous hydrogen peroxide solutions so that they may be safely shipped, stored and used as required. Other objects and advantages will appear as the description proceeds.

The attainment of the above objects is made possible by the instant invention which is directed to novel and unobvious stabilized aqueous compositions consisting essentially of water, hydrogen peroxide and a stabilizing amount of an organic phosphate ester. Thus, I have discovered that any aqueous solution containing from about 0.5 to 35% by weight hydrogen peroxide may be effectively stabilized against oxidative deterioration by the addition thereto of an organic phosphate ester.

By the term organic phosphate esters as used in this specification, I mean mono- and diphosphate esters and mixtures thereof of nonionic surface active agents having the molecular configuration of a condensation product of at least 1 mole of an alkylene oxide with 1 mole of an organic compound containing at least 6 carbon atoms and a reactive hydrogen atom selected from the group consisting of phenol, alkylphenols, aliphatic alcohols, fatty acids, fatty amines, fatty amides, rosin amines, long-chain-substituted aryl sulfonamides, long chain aliphatic sulfonamides and high molecular weight mercaptans. Such phosphate esters may be defined by the following general formula:

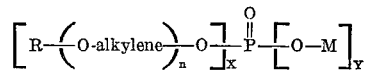

wherein R represents an organic radical of at least 6 carbon atoms; wherein the alkylene radical contains 2 to 5 carbon atoms; wherein $n$ is an integer of at least 1, preferably from 1 to 150; wherein Y represents an integer from 1 to 2, and the sum of the integers of X and Y is 3 and wherein M represents a radical selected from the group consisting of hydrogen and a salt forming cation, such as an alkali metal, an alkaline earth metal, ammonia and organic amines.

In general, these phosphate compounds may be easily obtained by condensing at least 1 mole of alkylene oxide such as propylene oxide, butylene oxide, ethylene oxide-propylene oxide mixtures, preferably ethylene oxide with 1 mole of an organic compound containing at least 6 carbon atoms and a reactive hydrogen atom, followed by esterification with a phosphating agent such as $P_2O_5$, $PCl_3$, $POCl_3$ and the like, or preferably by the esterification process taught in U.S. Patents 3,004,056 and 3,004,-057. The amount of alkylene oxide or equivalent, condensed with the reactive hydrogen-containing compound, i.e., the length of the polyalkylene chain will depend primarily upon the particular compound with which it is condensed. As a convenient rule of thumb, an amount of alkylene oxide or equivalent should be employed which will result in a condensation product containing about 10 to 99.5% by weight of the combined alkylene oxide. However, the optimum amount of alkylene oxide for attainment of the desired hydrophobic-hydrophilic balance may be readily determined in any particular case by preliminary test and routine experimentation.

The polyoxyalkylated derivatives of the reactive hydrogen containing compounds employed in the manufacture of the phosphate esters are well known in the art and commonly referred to as non-ionic surfactants. Numerous methods for their preparation and descriptions of their properties may be found in patents and other publications. As such compounds containing a reactive hydrogen atom there may be mentioned alcohols, phenols, alkylated phenols, thiols, primary and secondary amines, carboxylic and sulfonic acids and their amides.

A preferred group of nonionic surfactants which may be employed in preparation of phosphate esters for use in this invention is the group derived from phenol and alkylphenol compounds. Members of this group, i.e., polyoxyethylene oxide derivatives of phenolic compounds containing one or more alkyl substituents are described in U.S. Patents 2,213,477 and 2,593,112. Among those preferred are the polyoxyethylene derivatives of alkylphenols in which the total number of alkyl carbon atoms in the phenolic compound is from 1 to 36 carbon atoms, preferably from 4 to 20 carbon atoms. As examples of such alkylphenols there may be mentioned cresol, ethylphenol, propylphenol, butylphenol, amylphenol, hexylphenol, heptylphenol, octylphenol, nonyl phenol, decylphenol, dodecylphenol, tetradecylphenol, octadecylphenol, their mixtures or their isomers. The polyoxyethylene derivatives of secondary alkylphenols obtained by alkylating phenols or cresols with α-olefins of the type obtained by condensation of ethylene in the presence of Ziegler type catalysts or by wax cracking techniques are of particular value. α-Olefins useful in preparation of these alkylphenols may contain odd or even number carbon atoms which may be an advantage in many applications. Mixtures of α-olefins having various ranges of carbon atoms such as $C_6$–$C_7$, $C_7$–$C_9$, $C_9$–$C_{11}$, $C_{11}$–$C_{15}$, $C_{15}$–$C_{20}$ and higher may be used in the preparation of these alkylphenols. Olefins containing even number carbon atoms such as those derived from fats are also useful. Alkylphenols such as m-pentadecylphenol may also be used. In the preparation of these various phenols, olefins obtained by polymerization of low molecular weight olefins such as propylene, butylene, amylene, their isomers or their mixtures may be used. Likewise, the di- and trialkyl substituted derivatives of the aforementioned alkylphenols may be used, such as diisobutylphenol, diamylphenol, dinonylphenol, didodecylphenol, dioctadecylphenol, tri-t-butylphenol, trinonylphenol and the like.

Another preferred group of nonionic surfactants which may be employed in preparing phosphate esters for use in the instant invention are the polyoxyethylene derivatives of alcohols containing from 6 to 27 carbon atoms. These include polyoxyethylene derivatives of hexyl alcohol, octyl alcohol, decyl alcohol, dodecyl alcohol, tetradecyl alcohol, hexadecyl alcohol, octadecyl alcohol, dodecyl alcohol, heptacosyl alcohol, their isomers or their mixtures. The alcohols used in these surfactants may be produced by a variety of methods.

One of the common methods for synthesis of alcohols for use in synthesis of these nonionic surfactants is by hydrogenation of fatty acids or glycerides obtained from animal or vegetable oils and waxes such as coconut oil, castor oil, tall oil, peanut oil, menhaden oil, sperm oil, tallow or the like. Alcohols derived from these materials include lauryl alcohol, oleyl alcohol, stearyl alcohol, tallow alcohols or the like.

Another method for preparation of alcohols that are useful in synthesis of nonionic surfactants is the Oxo process. This process involves catalytic reaction of α-olefins with carbon monoxide and hydrogen under pressure to give primary aliphatic alcohols which have branched chains. α-Olefins of the type described above as well as olefin polymers such as dimers, trimers, tetramers, and pentamers obtained by polymerization of low molecular weight olefins may be used in the Oxo process. Polyolefins which may be employed in the Oxo process include tripropylene, tetrapropylene, pentapropylene, propylene-isobutylene, triisobutylene and tetraisobutylene. Alcohols from the Oxo process are obtained as mixtures and may be used as mixtures. Such Oxo alcohol mixtures include those of isooctyl alcohols, decyl alcohols, tridecyl alcohols, pentadecyl alcohols or heptadecyl alcohols.

A third method for producing alcohols which are useful in the synthesis of nonionic surfactants is by polymerization of ethylene with Ziegler type catalysts and subsequent reaction of the metal alkyls formed by this polymerization to obtain mixtures of straight chain alcohols of the type known as the Alfols (Continental Oil Company). Alcohols prepared by this method may be used as mixtures or specific alcohols may be separated and used individually. Examples of alcohols produced by this method include hexyl alcohol, octyl alcohol, decyl alcohol, higher alcohols or mixtures of these alcohols.

In addition to the above described nonionic surfactants, polyoxyethylene derivatives of organic mercapto compounds such as the products described in U.S. Patent 2,205,021, i.e., the polyoxyethylene derivatives of mercapto compounds such as dodecyl mercaptan, oleyl mercaptan, cetyl mercaptan, benzomercaptan, thiophenols or thionaphthols may be used. Other useful polyoxyethylene derivatives include the carboxylic acid amide derivatives described in U.S. Patent 2,085,706 and the sulfonamide derivatives described in U.S. Patent 2,002,613. Polyoxyethylene derivatives of aliphatic organic compounds such as those obtained from higher fatty acids and hydroxy fatty acids may also be used.

The following nonionic surfactants may be employed as reactants in the preparation of phosphate esters useful for the purpose disclosed in this invention. In the illustrations of these nonionic surfactants, E.O. means ethylene oxide; the number immediately preceding each formula refers to the number of moles of oxide thereof reacted with one mole of the given reactive hydrogen containing compound. Such nonionic surfactants include phenol+3 E.O., dioctadecylphenol+10 E.O., phenol+10 E.O., o-cresol+20 E.O., diisobutylphenol+30 E.O., nonylphenol+6 E.O., diamylphenol+8 E.O., dodecylphenol+20 E.O., diamylphenol+150 E.O., hexylphenol+15 E.O., octadecylphenol+20 E.O., nonylphenol+50 E.O., trinonylphenol+100 E.O., dioctadecylphenol+150 E.O., tall oil+18 E.O., castor oil+60 E.O., lauryl alcohol+40 E.O., isooctyl alcohol (Oxo alcohols)+5 E.O., decyl alcohol (Oxo alcohols)+15 E.O., tridecyl alcohol (Oxo alcohols)+9 E.O., tallow alcohol+30 E.O., stearyl alcohol+20 E.O., t-butylphenol+18 E.O., phenol+12 E.O., n-hexyl alcohol+11 E.O., isooctyl alcohol+50 E.O., stearyl alcohol+140 E.O., or octadecyl alcohol (Alfol alcohols)+150 E.O., nonylphenol+9–11 E.O., nonylphenol+2 E.O., dinonylphenol+7 E.O., dodecylphenol+18 E.O., castor oil+20 E.O., oleyl alcohol+20 E.O., lauryl alcohol+4 E.O., lauryl alcohol+15 E.O., hexadecyl alcohol+12 E.O., hexadecyl alcohol+20 E.O., octadecyl alcohol+20 E.O., Oxo tridecyl alcohol, (from tetrapropylene)+7 E.O., (from tetrapropylene)+10 E.O., (from tetrapropylene)+15 E.O.

Phosphate esters derived from the above nonionic surfactants may be prepared by a variety of methods. Numerous methods for the preparation of phosphate esters may be found in patents and other publications. Generally, we prefer to use one of the three following methods.

The first method involves reaction of 1 mole of $P_2O_5$ with 2 to 4.5 moles of nonionic surfactant as described and claimed in U.S. Patent 3,004,056 by Nunn and Hesse and in U.S. Patent 3,004,057 by Nunn. As disclosed in these patents, reaction between $P_2O_5$ and nonionic surfactant is conducted under substantially anhydrous conditions at temperatures below 110° C. This method gives mixtures of mono- and di-substituted phosphate esters.

The second method for preparing phosphate esters useful in the present invention is that disclosed in the copending application of Papalos, Ser. No. 243,721 filed Dec. 11, 1962. In this method, from 1 to 3 moles of $P_2O_5$ are reacted with 1 mole of nonionic surfactant in the presence of a small amount of water or a mineral acid at temperatures from 120° to 200° C. This method favors the formation of mono-substituted phosphate esters.

The third preferred method for producing phosphates is that disclosed in the copending application of Nehmsmann, Nunn and Schenck Ser. No. 275,222 filed Apr. 24, 1963. This method involves oxidation of mono-, di-substituted phosphites to the corresponding phosphates. In this method the phosphite is oxidized to a phosphate by use of elemental oxygen in the presence of a small amount of peroxide as a catalyst at temperatures between 25° and 200° C. This method may be used to produce mono-, or di-substituted phosphate esters in high states of purity as well as mixtures of these esters in which the concentration of each of these two types of esters may be maintained within close limits. The three methods for preparation of phosphate esters described in these patents and co-pending applications as well as the complete disclosures and teachings therein are herein incorporated by reference.

The phosphate compounds found to be useful preserving agents for aqueous hydrogen peroxide solutions may be added to said solutions in their free unneutralized form or in the form of their partially or completely neutralized salts containing as cations, alkali metals, alkaline earth metals, ammonium and organic amines. It is to be understood that such salts are to be regarded as the equivalent of the present products in their free form. As examples of suitable cations, there may be mentioned sodium, potassium, lithium, calcium, strontium, barium, magnesium, iron, tin, cadmium, aluminum, antimony, chromium, manganese, mercury, nickel, silver, zinc, ammonium and aliphatic, alicyclic, aromatic, and heterocyclic organic amines such as the mono-, di-, and trimethylamines, -ethylamines, -propylamines, -laurylamines, -stearylamines, -ethanolamines, propanolamines, butanolamines, hexanolamines, -cyclohexylamines, -phenylamines, pyridylamine, morpholinylamine, and the like.

The amount of phosphate preservative added to the aqueous hydrogen peroxide solutions is not critical, the only requirement being that sufficient amounts be added to inhibit decomposition of the hydrogen peroxide. It is obvious that the amount added will vary with the phosphate compound used as well as the amount of hydrogen peroxide present in the aqueous solution. However, from the standpoint of optimum results and economy, it has been found that normally, amounts of the phosphate preservative in the range of about 1 to 20% by weight are sufficient to stabilize the instant aqueous solutions of about 0.5 to 35% by weight hydrogen peroxide and inhibit the decomposition of said hydrogen peroxide. Of course, if desired, amounts higher than 20% by weight may be added.

The instant stabilized compositions have a wide range of utility in both the commercial and industrial fields; they are particularly useful for general cleaning purposes, since they may form the basis of washing concentrates, bleaching agents, textile finishing agents as well as disinfecting agents and cosmetic agents. It is, therefore, apparent that the present stabilized compositions may be formulated with the usual additives utilized in such compositions, depending upon the particular use contemplated.

The following examples are illustrative of the present invention and are not to be regarded as limitative. It is to be understood that all parts, percentages and proportions referred to herein and in the appended claims are by weight unless otherwise indicated. The phosphate esters employed in the following examples were prepared according to the process described in U.S. Patent 3,004,057 utilizing 1 mole of $P_2O_5$ with 2 to 4.5 moles of nonionic.

PROCEDURES 100 gram samples of the following compositions were prepared using aliquots of 30% hydrogen peroxide diluted with distilled water to give 9% by weight hydrogen peroxide in every composition. The samples were prepared in 4 oz. clear glass narrow mouth bottles and stored at ambient room temperature for a period of 4 weeks. After this period of 4 weeks, each of the samples were analyzed for available hydrogen peroxide by the $KMnO_4$ titration method described in Scott's "Standard Methods of Chemical Analysis" 5th Edition, vol. 2 (1939).

The various aqueous hydrogen peroxide compositions prepared by the above procedure were as follows:

Example I

| | Percent |
|---|---|
| Hydrogen peroxide | 9 |
| Distilled water | 91 |

Example II

| | Percent |
|---|---|
| Hydrogen peroxide | 9 |
| Sodium acid pyrophosphate ($Na_2H_2P_2O_7$) | 5.5 |
| Distilled water | 85.5 |

Example III

| | Percent |
|---|---|
| Hydrogen peroxide | 9 |
| Sodium salt of the phosphate ester of nonylphenol+6 E.O. (4 moles nonionic: 1 mole $P_2O_5$) | 5 |
| Distilled water | 86 |

Example IV

| | Percent |
|---|---|
| Hydrogen peroxide | 9 |
| Phosphate ester of nonylphenol+6 E.O. (4 moles nonionic: 1 mole $P_2O_5$) | 5 |
| Distilled water | 86 |

Example V

| | Percent |
|---|---|
| Hydrogen peroxide | 9 |
| Phosphate ester of nonylphenol+8.9 E.O. (2.7 moles nonionic: 1 mole $P_2O_5$) | 5 |
| Distilled water | 86 |

Example VI

| | Percent |
|---|---|
| Hydrogen peroxide | 9 |
| Sodium salt of phosphate ester nonylphenol+6 E.O. (4 moles nonionic: 1 mole $P_2O_5$) | 10 |
| Distilled water | 81 |

The stability recorded for the above aqueous hydrogen peroxide compositions as determined by the aforementioned procedure is shown in the following table:

TABLE I

| Composition [1] | pH | Effervescence | Ml. of 0.102 N $KMnO_4$ for Titration | Grams. of $H_2O_2$ Available | Grams. of $H_2O_2$ Loss | Percent $H_2O_2$ Loss |
|---|---|---|---|---|---|---|
| Example I | 3.8 | Yes | 12.2 | 0.0211 | 0.0239 | 53.2 |
| Example II | 3.7 | Yes | 18 | 0.0311 | 0.0139 | 30.9 |
| Example III | 3.4 | No | 23.5 | 0.0407 | 0.0043 | 9.5 |
| Example IV | 1.9 | No | 23.5 | 0.0407 | 0.0043 | 9.5 |
| Example V | 1.8 | No | 23.8 | 0.0412 | 0.0038 | 8.5 |
| Example VI | 3.5 | No | 23.9 | 0.0413 | 0.0037 | 8.2 |

[1] Each original composition contained 0.0450 grams of hydrogen peroxide.

Example VII

Similar results may be obtained by adding to various aqueous peroxide solutions stabilizing amounts of other phosphate antioxidant agents. The examples in the following table are only illustrative of the present invention and are not to be regarded as limited.

TABLE II

| Alcohol | Moles of E.O. | Moles of Nonionic | Moles of $P_2O_5$ | Salt |
|---|---|---|---|---|
| Nonylphenol | 9 | 2.7 | 1 | |
| Do | 9 | 2.7 | 1 | Na |
| Do | 11 | 4.0 | 1 | |
| Do | 6 | 4.0 | 1 | |
| Dodecylphenol | 6 | 4.0 | 1 | |
| Nonylphenol | 2 | 4.0 | 1 | |
| Do | 4 | 4.0 | 1 | Na |
| Do | 50 | 0.5 | 1 | |
| Do | 50 | 1.0 | 1 | |
| Do | 100 | 4.0 | 1 | |
| Dinonylphenol | 7 | 2.7 | 1 | |
| Didodecylphenol | 6 | 2.7 | 1 | Na |
| Dodecylphenol | 6 | 2.7 | 1 | $NH_4$ |
| Butylphenol | 9 | 4.0 | 1 | |
| Tri-isobutylphenol | 10 | 4.0 | 1 | |
| Hexadecylphenol | 4 | 2.7 | 1 | Na |
| Octadecyl alcohol | 9 | 2.7 | 1 | |
| Phenol | 10 | 2.7 | 1 | |
| Isooctyl (Oxo alcohols) | 5 | 4.0 | 1 | Na |
| Decyl alcohol (Oxo alcohols) | 15 | 4.0 | 1 | |
| Tallow alcohol | 30 | 4.0 | 1 | Na |
| Octadecyl alcohol (Alfol alcohols) | 150 | 4.0 | 1 | H |

This invention has been disclosed with respect to certain preferred embodiments and various modifications and variations thereof will be obvious to persons skilled in the art and it is to be understood that such modifications and variations are intended to be included within the purview of this application and the spirit and scope of the appended claims.

I claim:
1. A stabilized aqueous composition consisting essentially of an aqueous solution of about 0.5 to 35% by weight hydrogen peroxide and a stabilizing amount of an organic phosphate ester selected from the group consisting of monophosphate esters, diphosphate esters and mixtures thereof, wherein said phosphate esters have the general formula

$$[R-(O\text{-Alkylene-})_nO-]_X \overset{O}{\underset{\|}{P}}[-O-M]_Y$$

wherein R represents an organic radical of at least 6 carbon atoms, wherein the alkylene radical contains from 2 to 5 carbon atoms, wherein $n$ is an integer of at least 1, wherein Y represents an integer of from 1 to 2 and the sum of the integers of X and Y is 3 and wherein M represents a radical selected from the group consisting of hydrogen, an alkali metal, an alkaline earth metal, ammonia, and an amine radical.

2. A stabilized aqueous composition as defined in claim 1, wherein R represents an alkylated phenyl radical.

3. A stabilized aqueous composition as defined in claim 2, wherein R represents a nonylphenol radical.

4. A stabilized aqueous composition as defined in claim 1, wherein $n$ represents a positive integer from 1 to 150 inclusive.

5. A stabilized aqueous composition as defined in claim 4, wherein $n$ represents a positive integer from 6 to 9 inclusive.

6. A stabilized aqueous composition as defined in claim 1, wherein the organic phosphate ester is a mixture of mono- and diphosphate esters.

References Cited
UNITED STATES PATENTS
3,194,768   7/1965   Lindner et al. _____ 23—207.5
3,222,294   12/1965   Meyer _____ 23—207.5

OSCAR R. VERTZ, Primary Examiner.
H. S. MILLER, Assistant Examiner.